Dec. 26, 1961 R. P. DICIUS 3,014,990

TELEPHONE HANDSET HOLDING DEVICE

Filed June 2, 1958

INVENTOR.
R. P. Dicius

BY C. R. Sipe
Atty

United States Patent Office 3,014,990

Patented Dec. 26, 1961

3,014,990
TELEPHONE HANDSET MOLDING DEVICE

Renualdas P. Dicius, Chicago, Ill., assignor to Automatic Electric Laboratories, Inc., a corporation of Delaware Filed June 2, 1958, Ser. No. 739,087
3 Claims. (Cl. 179—100)

The case relates to telephone substation units and more particularly to devices for normally holding the telephone handset firmly in place.

The main object of the present invention is to provide a novel arrangement for firmly keeping the handset of a telephone substation unit in its at rest position and which also allows easy removal of the handset when required.

It is an object of the present invention to provide a handset which contains an internal holding device for resting and maintaining the handset in the cradle of the telephone base.

The telephone shown herein has been designed for use in automobiles, on shipboard or in any other mobile location. Generally where a handset is subject to vibrations and other forms of jostling, all forms of holding devices have been tried. These have included wire spring clips around the outside of the handle, positive locks about the transmitter or the receiver or both. These holding methods have adequately served their primary function of holding but are in the main protrusions which are either bulky or which tend to snag objects which may be passing.

The present invention therefore, shows a completely inconspicuous holding device comprising a ball-headed stud mounted in the cradle of the telephone base and a matching cavity within the handle of the handset. A spring latch of flat spring material is mounted in the handle cavity to receive the ball end of the stud and thereby firmly lock the handset in the cradle. To remove the handset, the handle is given a sharp upward tug and the ball-to-latch engagement is freed. Thus, the holding device retains the handset firmly in place despite the shock or jarring that can be normally expected in a mobile mounted unit.

Figure 1:
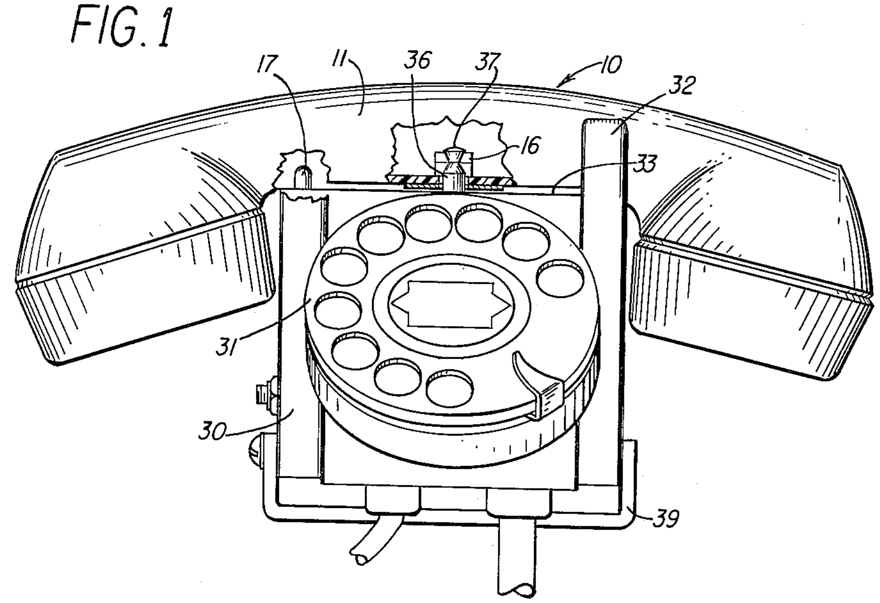
FIG. 1 shows a front view of the telephone with a cut-out portion showing the holding device.

In FIG. 1 is shown a mobile type telephone having a monophone base 30 which has a dial 31 at its exposed side. The base has a cradle 33 with upright tines 32 defining the bounds of the cradle and generally maintaining the handset 10 in place.

Figure 2:
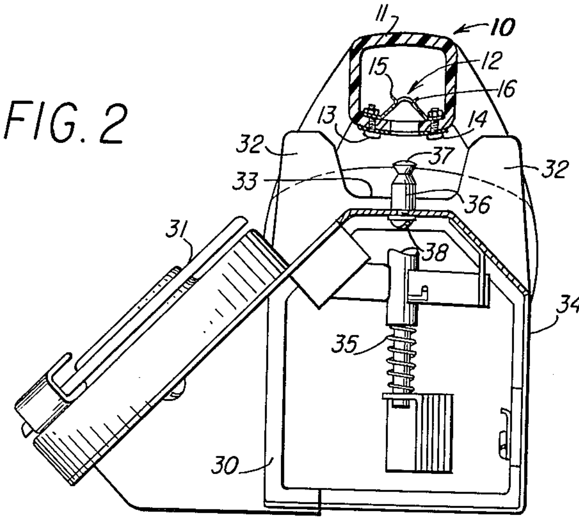
FIG. 2 shows a cross-section of a side view of the telephone.

Between the left set of tines as shown in FIG. 1 is shown plunger 17. This plunger is depressed by restoration of the handset to the cradle to thereby release the hookswitch assembly (not shown) by means of stud 35 (FIG. 2). This plunger and hookswitch assembly, which is of generally known design, are completely separate from holding stud 36 which is mounted in the center of cradle 33.

The stud 36 is internally threaded so that it can be mounted upright into this base of cradle 33. A screw 38 with lock washer under its head is used to fasten the stud firmly into the cradle 33. The stud has at its exposed extremity a ball-like section 37.

The handset 10 has a cavity in the undersurface of the handle portion 11 midway between the transmitter and receiver ends. A snap latch 12 is mounted to the surface of the handle by means of screws 13 and 14 and their attached nuts. The latch thereby is maintained internally in the handset and of course has no protrusions which can become entangled with cords or other obstructions. The button or stud 36 which is mounted in the base of the cradle is completely hidden within the handset when the handset is in its normal resting position. When the handset is removed from the cradle, the stud 36 is still within the bounds of the cradle as defined by the cradle tines 32 and for this reason cannot be readily entangled with the handset lead wires or other movable parts.

Figure 3:
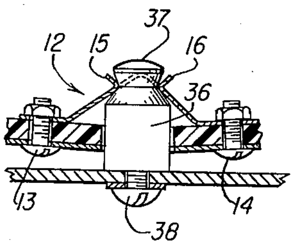
FIG. 3 shows a detailed view of the holding arrangement.

It may further be noted in FIG. 3 that the transverse profile of handset handle 11 is slightly convex resulting in a concave lower inner surface to the cavity therein, and that the spring latch 12 must be arched to match the contour. This arching effect causes greater pressure to be exerted by latch ears 15 and 16 against stud 36 to resist the outward movement of the stud than is presented to the insertion thereof.

The holding device as shown, holds the handset firmly against movement out of the cradle and yet can be removed manually without an excessive amount of pulling or tugging.

What is claimed is:

1. In a telephone substation unit including a base and a handset for use in locations subject to jarring and shock, means for maintaining said handset on said base in a normal position including a plurality of protruding tines fitting about the contour of the handset for positioning said handset relative to said base, means for yieldably holding said handset within said tines comprising: a ball-headed stud mounted centrally within said tines and firmly affixed perpendicular to said base; a cavity in said handset defined by a top surface, two side surfaces, two end surfaces, and a bottom surface having an aperture therethrough located to receive said stud when said handset is in its normal position; a plurality of spring members each having one end fixed within said cavity adjacent said aperture with its free end terminating adjacent to the geometric center of said aperture for applying a predetermined lateral spring pressure to said stud responsive to deformation thereof by the insertion of said stud whereby said handset is rendered immobile relative to said base except in response to forces applied thereto which are sufficient to overcome said spring pressure.

2. In a telephone substation unit including a main base and a handset for use in locations subject to jarring and shock and having means in said base, including a plurality of protruding tines fitting about the contour of said handset, for maintaining said handset in a normal position relative to said base, means for yieldably holding said handset within said tines comprising: a stud centrally mounted within said tines protruding from and firmly affixed perpendicular to said base; a cavity in said handset defined by a top surface, two side surfaces, two end surfaces, and a concave bottom surface having an aperture therethrough located to receive said stud; a plurality of spring members each fixed at one end to said concave surface adjacent said aperture with its free portion pretensioned to form an acute angle with the concave surface and terminating adjacent to the geometric center of said aperture for distortion responsive to a predetermined inward force applied by insertion of said stud to yieldably engage the stud, whereby said handset is removable responsive only to an outwardly applied force of greater magnitude than said predetermined inwardly applied force.

3. In a side mounting telephone substation set comprising a main housing and a handset, said main housing having at its upper extremity four protruding tines, said handset comprising a pair of transducer housings and a handle therebetween, the tines of said base spaced to form a pair of U shaped nests for balancing therein the handle of said handset, a plunger in the base of one of said nests contactable by said handset handle to activate a hookswitch; means for restraining said handset from accidental motion out of said nests comprising a ball headed stud extending from said base substantially centrally between said nests, said stud firmly affixed to said base independently of said plunger and holding spring means firmly affixed to said handset, said spring means having a pair of springs located for temporary deformation only by said ball to grasp said stud responsive to inward movement thereof and to release said stud responsive to outward movement thereof, whereby said handset is removable from said restraining means solely by motion upward of said handset.

References Cited in the file of this patent

UNITED STATES PATENTS 2,518,385 Shannn ------------------ Aug. 8, 1950